United States Patent [19]

Hartnack et al.

[11] Patent Number: 4,924,309

[45] Date of Patent: May 8, 1990

[54] METHOD AND CIRCUIT ARRANGEMENT FOR IMPROVING THE RESOLUTION OF THE COEFFICIENTS OF DIGITAL SIGNALS, PARTICULARLY DIGITAL TV SIGNALS

[75] Inventors: Wolfgang Hartnack, Hemmingen; Heinz-Werner Keesen; Herbert Schütze, both of Hanover, all of Fed. Rep. of Germany

[73] Assignee: Deutche Thomson-Brandt GmbH, Hanover, Fed. Rep. of Germany

[21] Appl. No.: 235,057

[22] Filed: Aug. 23, 1988

[30] Foreign Application Priority Data

Aug. 26, 1987 [DE] Fed. Rep. of Germany ....... 3728444

[51] Int. Cl.$^5$ .............................................. H04N 7/12
[52] U.S. Cl. .................................... 358/133; 358/166; 358/37; 358/13
[58] Field of Search ................. 358/133, 138, 13, 135, 358/37, 166, 260; 364/725; 382/56

[56] References Cited

U.S. PATENT DOCUMENTS

| 4,654,695 | 3/1987 | Fling | 358/133 X |
| 4,698,689 | 10/1987 | Tzou | 358/133 X |
| 4,707,738 | 11/1987 | Ferre et al. | 358/135 |

OTHER PUBLICATIONS

"Coding of Video Signals"; Bostemann et al.; *Elektrisches Nachrichtenwesen*; vol. 59, No. 3; 1985; pp. 286–294.

*Primary Examiner*—James J. Groody
*Assistant Examiner*—Victor R. Kostak
*Attorney, Agent, or Firm*—Spensley Horn Jubas & Lubitz

[57] ABSTRACT

A method and apparatus for the improvement of the resolution of digital signals. In digital TV signals which are transformed into a frequency domain, irregularities in the pattern of the reproduced video signals occur because of rounding off errors, when the number of bits per sample is reduced during calculation of the coefficients. This is remedied by increasing the coefficients of the transformed signal values following at least one first coefficient, for example a DC-coefficient, and reducing them again after inverse transformation. This is applicable to digital systems using block processing in which, because of a limited amount of bits, a rounding off of the transmitted spectral coefficients is performed in the calculation.

7 Claims, 1 Drawing Sheet

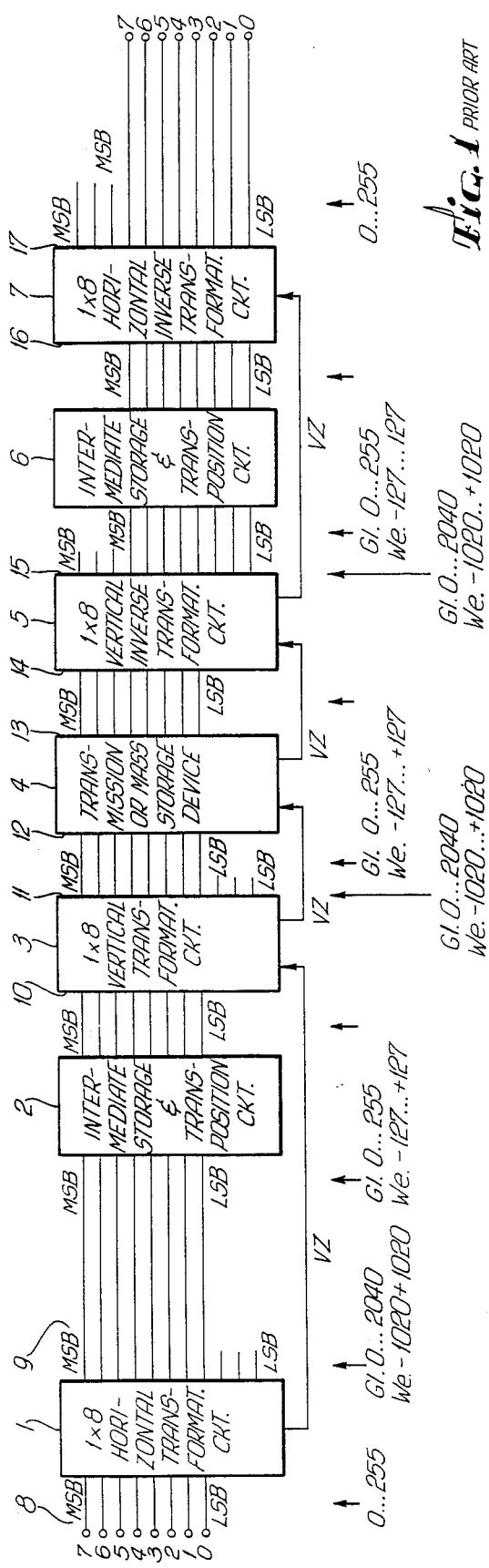
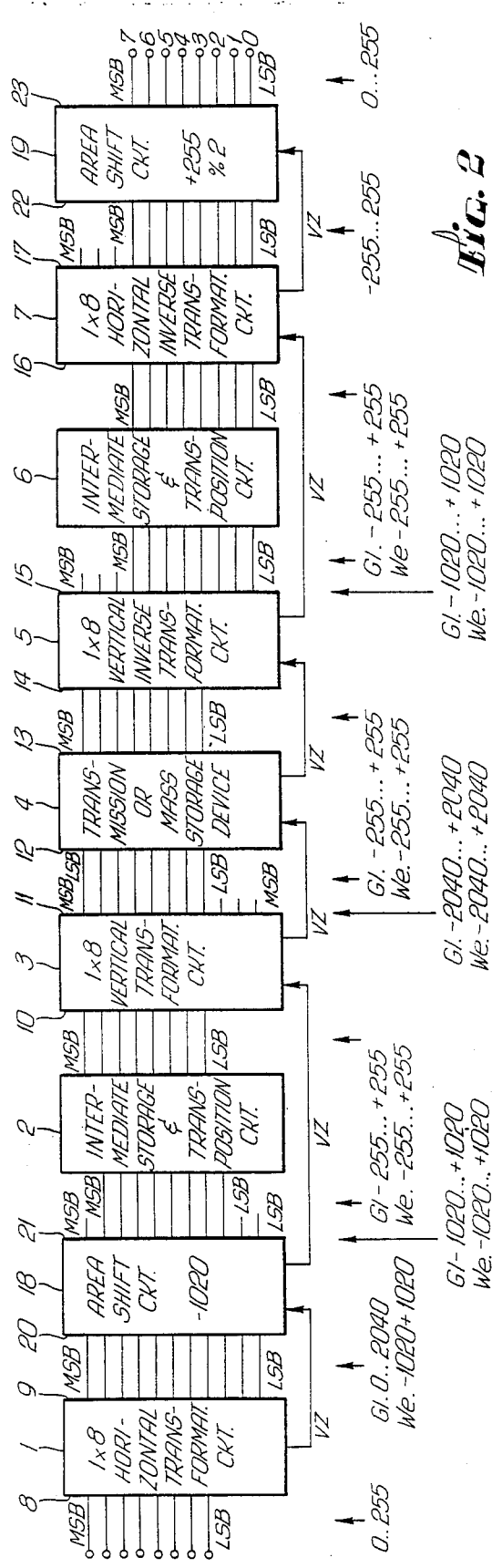

METHOD AND CIRCUIT ARRANGEMENT FOR IMPROVING THE RESOLUTION OF THE COEFFICIENTS OF DIGITAL SIGNALS, PARTICULARLY DIGITAL TV SIGNALS

BACKGROUND OF THE INVENTION

The invention relates to a method and circuit arrangement for improving the resolution of digital signals, in particular luminance and/or chrominance TV signals, the sampled values of which are transformed in blocks, for example by discrete cosine transformation, in such a way that one positive coefficient representing a uniform component and several negative and/or positive coefficients representing alternate components are created and are, in the course of calculation, limited to a smaller number of values, rounded off and inversely transformed after transmission and/or storage.

In order to reduce the quantity of data during digital transmission of TV signals, it is known to initially transform the TV signals in blocks from the spatial domain to the frequency domain, then to transmit only those spectral coefficients obtained by means of the transformation which are essential and to zero out the nonessential ones, and finally to inversely transform the transformed values back into the spatial domain. Transformation takes place by a multiplication of the signal values with a transformation function, the number of bits per sample increasing because of multiplication within the transformation. In order to reduce the number of bits per sample, but still having a sufficient resolution of the gradations of the luminance and/or chrominance signal values, for example 8 bits plus sign, a two-times integer division of the coefficient blocks and thus a rounding off of the transformation values is performed in connection with, a two-dimensional transformation for example, of the block size $8 \times 8$.

Such a technique is described, for example, by G. Bostelmann, et al., in an article entitled "Codierung von Videosignalen [Coding of Video Signals]" in Elektrisches Nachrichtenwesen, Vol. 59, No. 3, 1985, pages 286-294.

It has been shown that with small AC-coefficients of the transformed coefficients, i.e., with smooth patterns of the original picture, coarser patterns appear after inverse transformation. The reason for this is that, because of the rounding off of the transformed values, information is lost and thus is lacking after inverse transformation. This gives rise to visible interference because of a lack of masking by signal components with higher frequencies.

SUMMARY OF THE INVENTION

It is an object of the present invention to obtain an improved reproduction of smaller signal changes in the original range after inverse transformation while limiting the number of places, i.e., bits, of each signal word in the frequency domain.

The above and other objects of the invention are achieved by a method for improving the resolution of digital signals, in particular luminance and/or chrominance TV signals, composed of scanning values having spatial domain, in a system in which the sampled values are transformed in blocks, for example by discrete cosine transformation, in such a way that one positive coefficient representing a DC-coefficient and several negative and/or positive coefficients representing AC-coefficients are created, each kind of coefficient having a given value range, and each coefficient is in the course of calculation limited to a smaller range of values, by rounding off and shifting and inversely transformed after transmission and/or storage, the method comprising: shifting the value range of each DC-coefficient after transformation and prior to transmission or storage, into the same value range as is occupied by the AC-coefficients and providing each DC-coefficient with a sign; and after transmission or storage, returning each DC-coefficient to its original value range.

The DC-coefficients on the one hand and the AC-coefficients on the other, calculated after the transformation of the sampled values, occupy different number areas. The DC-coefficient only contains positive values, while the AC-coefficient contain positive and negative values, however. In addition the magnitudes of the AC-coefficients can be at most one-half that of the DC-coefficient. Thus, the spread between the smallest and largest possible values in the DC-coefficients and the AC-coefficients is the same. This effect is used in the invention to obtain uniform areas for the values of the DC-coefficient and of the AC-coefficients by shifting one of the number areas. Because of this the available value range of the data words can be optimally used for the quantization of the coefficients.

It is also an object of the invention to provide a circuit arrangement which allows an improved reproduction of small signal changes in the spatial domain after inverse transformation while limiting the number of possible values in the frequency domain.

This object is attained in a circuit arrangement for improving the resolution of digital signals, in particular of luminance and/or chrominance TV signals, composed of sampled values having an original value range, in a system including: direct transformation means for transforming the sampled values in blocks, for example by discrete cosine transformation, in such a way that one positive coefficient representing a DC-coefficient and several negative and/or positive AC-coefficients are created, each coefficient having a given value range, and each coefficient is in the course of calculation limited to a smaller range of values, and rounded off; inverse transformation means for inversely transforming the coefficients created in the first transformation means into sampled values in the spatial domain; and means connected for transmitting the coefficients created in the first transformation means to the inverse transformation means, the circuit arrangement comprising a first area shift circuit in the direct transformation means for shifting the value range of each DC-coefficient into the same value range as is occupied by the AC-coefficients representing, and a second area shift circuit in the inverse transformation means for returning each coefficient representing a DC-coefficient to its original value range, each area shift circuit including circuit means for generating or evaluating a sign for each coefficient depending on the magnitude of the coefficient.

Improvements and advantageous exemplary embodiments of the invention ensue from the dependent claims, the description and the drawings, by means of which exemplary embodiments of the invention are described below.

BRIEF DESCRIPTION OF THE DRAWING

FIG. 1 is a diagram of a well known embodiment of a circuit arrangement for the transformation of digital signals from spatial domain to frequency domain with a limitation in the number of possible values of each signal word and a subsequent inverse transformation into the spatial domain.

FIG. 2 is a similar view of a second embodiment according to the invention with additional area shift circuits.

DESCRIPTION OF THE PREFERRED EMBODIMENTS

The transformation circuit shown in FIG. 1 is suitable for the processing of TV signals in which the TV picture data is divided into square blocks each containing 8×8 pixels, i.e., each block represents a rectangular picture area composed of 8 rows and 8 columns of pixels. Each pixel can produce a scanning value with a quantization of 256 quantization steps corresponding to the luminance and/or chrominance values in the form of an eight-bit data word. Based on the two-dimensional extent of the block, a two-dimensional transformation is performed, in which first a horizontal, first dimension and then a vertical, second dimension is transformed.

To perform this transformation, the circuit arrangement shown in FIG. 1 includes a first, horizontal, transformation circuit 1, a first intermediate storage and transposing circuit 2, and a second, vertical, transformation circuit 3. Circuit 3 is followed by a transmission channel or a mass storage device 4. Downstream of device 4 there is provided an inverse transformation system composed of a third, vertical, transformation circuit 5, a second intermediate storage and transposing circuit 6, and a fourth, horizontal, transformation circuit 7.

The four transformation circuits 1, 3, 5 and 7 are interconnected by lines VZ conducting sign bits may each be in form of a memory or a respective memory region, for example, in the storage locations of which all occurring transformed values, which were calculated with the transformation function, are contained and are moved to the outputs when their inputs are addressed. The intermediate storage and transposing circuits 2 and 6 may be in the form of memories, in which the order of the stored values is changed in such a way that the values formerly contained in rows are transferred to columns, and vice versa. The matrix forming the coefficients thus is rotated by 90°.

Below the various blocks of FIG. 1, decimal values are given for the value range occupied by the sampled values or, after transformation, by the DC-coefficients and the AC-coefficients.

The sampled values appearing at the input 8 occupy a value range from 0 to 255. Under the assumption that eight pixels of an 8×8 matrix are transformed in the first, e.g., horizontal, dimension, the number of signal value levels at the output 9 of transformation circuit 1 increases by a factor of eight. Thus, at the output 9 the value range (G1) of the DC-coefficient extends between the numerical values from 0 to 2040 and that (We) of the AC-coefficients from −1020 to °1020. By ignoring the three places, or bits, of lowest value (LSB), a division of the coefficients by eight takes place. The thus divided coefficients are also the basis for the values supplied to the input 10 of second transformation circuit 3, following which the newly transformed coefficients at the output 11 are again increased by a factor of eight. By again ignoring the three bits of least value (LSB), the newly transformed coefficients are limited to the already mentioned range of the DC-coefficient and the AC-coefficients.

Although there are values having 256 gradations available at the input 12 of a transmission channel or mass storage device 4 for the DC-coefficient, there are only 128 gradations for the AC-coefficients. Therefore, the values for the AC-coefficients are more coarsely quantized and possible quantization errors become apparent as interference in that stairstep patterns become visible in the course of gradual luminance or chrominance changes.

After storage and/or transmission, the transformed values present at the output 13 are inversely transformed back into the video area, this in the reverse manner from the first transformation. Inverse transformation first takes place one-dimensionally by column. From the data words present at the input 14, data words are calculated after inverse transformation at the output 15 which provides a value range of 0 to 2040 for the DC-coefficients and a value range of −1020 and +1020 for the AC-coefficients. However, the value range conducted to device 6 only extends from 0 to +255 for the DC-coefficients and from −127 to +127 for the AC-coefficients, because the higher binary places are equal to zero. The three places of highest value (MSB) do not need to be considered. Of the value range mentioned, a DC-coefficient uses from 0 to 255 and the AC-coefficients from −127 and +127.

Data words in these value ranges reach the input 16 of the fourth transformation circuit 7 after the lines and columns have been exchanged in the intermediate storage and transporting circuit 6. After inverse transformation, data words again appear at the output 17 of the fourth transformation circuit 7, the three places of highest value (MSB) not being considered. The value range of the samples again lies between 0 and 255.

The circuit arrangement of FIG. 2 is basically similar to that of FIG. 1 and is additionally provided with area shift circuits 18 and 19 which may be, for example, in the form of adding circuits for adding a variable value to a constant value. When processing the first transformed DC-coefficient with its number of possible values not yet limited, half of its maximum value range is subtracted from the respective value of the uniform value present at the input 20, i.e., from 2040 to 1020, so that the new value range at the output 21 now lies between −1020 and +1020. Thus, the value range of the DC-coefficients coincides with that of the AC-coefficients. Instead of a division by eight by omission of the three places of least value (LSB), only a division by four is performed here. The negative number range of the DC-coefficient which is now possible is marked by a sign in the same way as for the AC-coefficients. This step benefits the AC-coefficients which now can be processed in the transformation circuit 3 with a resolution from −255 to +255.

In the following steps the further transformation and inverse transformation correspond to those of FIG. 1. However, after inverse transformation of the second dimension, it becomes necessary to reestablish the original range. This is done by means of the further area shift circuit 19, in which the number value 255 is added to the data words present at the input 22 and the result is divided by two. A data word can then be read from output 23, the value range of which extends from 0 to 255.

By means of the described step it is possible, without an increase in the number of bits, to store or transmit the coefficients with a resolution greater by a factor of two, which leads to a more gradual and less noticeable gradation of the luminance and chrominance values during the reproduction of the values in the spatial domain.

This application relates to subject matter disclosed in Federal Republic of Germany Application P 37 28 444.4, filed on Aug. 26, 1987, the disclosure of which is incorporated herein by reference.

While the description above shows particular embodiments of the present invention, it will be understood that many modifications may be made without departing from the spirit thereof. The pending claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for improving the resolution of digital signals, in particular luminance and/or chrominance TV signals, composed of sampled values having an original value range, in a system in which the sampled values are transformed in blocks in such a way that one positive coefficient representing a DC-coefficient and several negative and/or positive coefficients representing AC-coefficients are created, each coefficients having a given value range, and each coefficient is in the course of calculation limited to a smaller range of values, rounded off and inversely transformed after transmission and/or storage, said method comprising: shifting the value range of each coefficient containing a DC-coefficient, after transformation and prior to transmission or storage, into the same value range as is occupied by the coefficients containing the AC-coefficients and providing each coefficient containing a DC-coefficient with a sign; and after transmission or storage, returning each coefficient containing a DC-coefficient to its original value range.

2. A method as defined in claim 1 wherein said step of shifting comprises subtracting a value corresponding to one-half the given value range of each coefficient representing a DC-coefficient from the value of that coefficient, and said step of returning comprises adding to each shifted coefficient representing a DC-coefficient a value so that it is corresponding to the original value range.

3. A method as defined in claim 2 wherein the transformation and inverse transformation are each two-dimensional, said step of subtracting is carried out after transformation of the first dimension, and said step of returning is carried out after the inverse transformation of the last dimension.

4. A circuit arrangement for improving the resolution of digital signals, in particular of luminance and/or chrominance TV signals, composed of sampled values having an original value range, in a system including: direct transformation means for transforming the sampled values in blocks in such a way that one positive coefficient representing a DC-coefficient and several negative and/or positive coefficients representing AC-coefficients are created, each coefficient having a given value range, and each coefficient is in the course of calculation limited to a smaller range of values, and rounded off; inverse transformation means for inversely transforming the coefficients created in said direct transformation means into sampled values in the original value range; and means connected for transmitting the coefficients created in said direct transformation means to said inverse transformation means, said circuit arrangement comprising a first area shift circuit in said direct transformation means for shifting the value range of each coefficient representing a DC-coefficient into the same value range as is occupied by the coefficients representing AC-coefficients, and a second area shift circuit in said inverse transformation means for returning each coefficient representing a DC-coefficient to its original value range, each said area shift circuit including circuit means for generating or evaluating a sign for each coefficient depending on the magnitude of the coefficient.

5. A circuit arrangement as defined in claim 4 wherein said first area shift circuit is an adding circuit which applies to each DC-coefficient a subtrahend having a value equal to one-half of the value range of each coefficient representing a DC-coefficient, and said second area shift circuit is an adding circuit which applies to each coefficient an addend having a value equal to one-half of the value range of each coefficient representing a DC-coefficient.

6. A circuit arrangement as defined in claim 5 wherein each said transformation means performs a two-dimensional transformation and includes a first transformation circuit for performing a transformation in a first dimension and a second transformation circuit connected downstream of said first transformation circuit for performing a transformation in a second dimension, said first area shift circuit is connected downstream of said first transformation circuit of said direct transformation means, and said second area shift circuit is connected downstream of said second transformation circuit of said inverse transformation means.

7. A circuit arrangement as defined in claim 4 wherein each said transformation means performs a two-dimensional transformation and includes a first transformation circuit for performing a transformation in a first dimension and a second transformation circuit connected downstream of said first transformation circuit for performing a transformation in a second dimension, said first area shift circuit is connected downstream of said first transformation circuit of said direct transformation means, and said second area shift circuit is connected downstream of said second transformation circuit of said inverse transformation means.

* * * * *